Oct. 31, 1961 L. R. BROWN 3,007,149
ANALOG TO DIGITAL CONVERTER AND RECORDER
Filed March 9, 1959
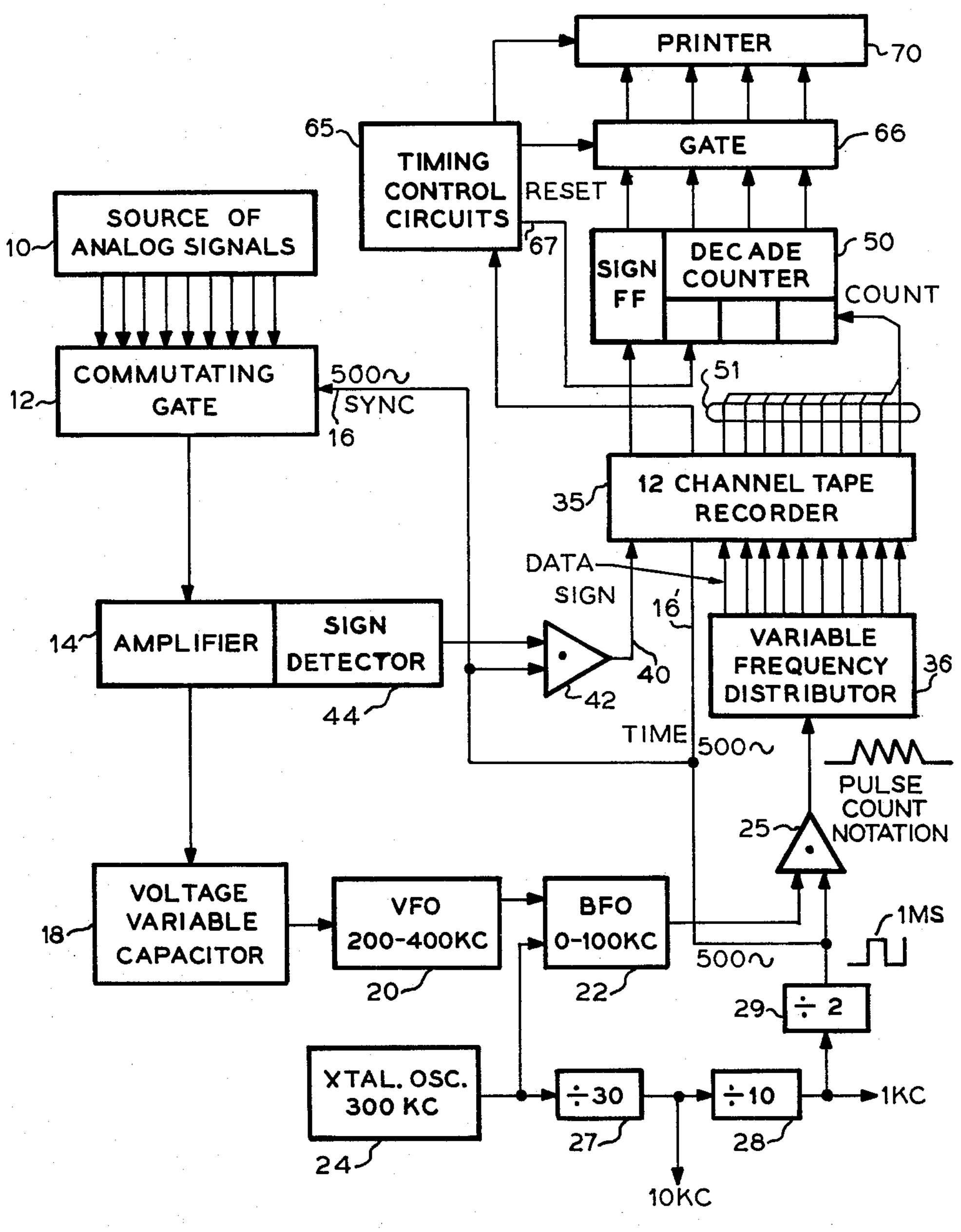
INVENTOR.
Laurence R. Brown 3,007,149

ANALOG TO DIGITAL CONVERTER AND RECORDER

Laurence R. Brown, Berwyn, Pa., assignor, by mesne assignments, to Drexel Dynamics Corporation, Philadelphia, Pa., a corporation of Pennsylvania Filed Mar. 9, 1959, Ser. No. 798,236
4 Claims. (Cl. 340—347)

This invention relates to data logging means and more particularly it relates to a system for converting analog signals into digital form for recording.

In providing analog to digital conversion it is desirable to produce a system capable of many samplings a second in order to follow quickly changing signals. In many instances it is also desirable to provide a recorder system of small size and therefore capable of air borne use. Thus the complexity of the converter should be minimized to permit small size and yet not detract from conversion accuracies or institute the need for precise tolerance control of the components.

Furthermore, where converters are dependent upon a reference voltage level, inaccuracies are easily superimposed by noise signals or variations of supply voltages.

Another feature of advantage is the ability to handle signals of either positive or negative polarity.

It is therefore an object of the invention to provide a simple and improved system for converting analog signals to digital form with good conversion accuracies and capable of fast sampling rates.

A further object of the invention is to provide an accurate conversion system having little susceptibility to noise pulses and power supply variations.

Another objective of the invention is to provide a converter sensitive to signals of either positive or negative polarity. A signal responsive reactance device controls a variable frequency oscillator to provide in combination with a stable oscillator, a beat frequency which is a function of the signal amplitude. The stable oscillator also serves as an accurate time reference from which a gating signal is derived to sample the beat frequency for a digital signal in pulse count notation. This may be recorded on a magnetic tape for subsequent conversion in a decade counter from pulse count notation to decimal form.

Frequencies involved for rapid sampling and pulse count notation frequently exceed the recording frequency response of a magnetic recorder which can be economically produced. Thus, the pulse count signals are commutated among several recording channels to produce a multiple channel record wherein the signal recorded upon each channel is within the recorder frequency response characteristic.

The foregoing features and other objects and advantages of the invention will be included in the ensuing description of the invention and its operation, in which reference is made to the accompanying drawing. In the drawing, a block system diagram is shown of the analog to digital conversion system embodying this invention.

In this system, a source of several low level analog signals is provided as derived from a group of strain gages or the like. A single channel is chosen from the group by the commutating gate 12 for amplification at an amplifier stage 14. The commutating gate 12 is synchronized at a clock frequency by timing pulses at lead 16 to sequentially scan the various channels at fixed time intervals. The commutation may be accomplished with a magnetron beam switching tube type 6701 actuating one of a plurality of crystal diode gating circuits for each target position. Techniques for using this tube are described in Catalog 57 issued by the Electronic Tube Division of the Burroughs Corp.

The voltage variable capacitor 18 is connected with the selected analog signal at amplifier 14, and is also connected to control the frequency of the variable frequency oscillator (VFO) 20. This operates to control frequency in the manner described in an article entitled "A Voltage Variable Capacitor," by Gene F. Straube, published in Electronic Industries, vol. 17, No. 7, July 1958.

A beat frequency oscillator (BFO) circuit 22 of conventional circuit design can be used incorporating the output signals of the variable frequency oscillator 20 and a stabilized or crystal controlled oscillator 24. With representative values consider the variable capacitor 18 to change the frequency of the variable frequency oscillator 20 between 200 kc. and 400 kc. depending upon the amplitude of the analog signals. This when beat against the crystal oscillator frequency of 300 kc. will provide a beat frequency of 0 to 100 kc.

A zero signal at capacitor 18 provides an oscillator frequency of 300 kc. so that either positive or negative signals may give an output reading of amplitude independent of the polarity.

Assuming that the gate 25 permits pulses to pass during a time interval of one millisecond, the number of pulses gated for a sampling period lies between 0 and 100, depending upon the signal amplitude. Thus an input signal range of 0 to 1 volt can be converted to pulse count notation designating increments of one millivolt using these frequencies.

The time intervals of one millisecond can be produced very accurately by counting 3000 cycles from the crystal oscillator output. Thus, in counter 27, a count down of thirty provides 10 kc. clock pulses. In counter 28, the 10 kc. pulses are converted to 1 kc. pulses arriving every millisecond. A further counter 29 is used to determine the duty cycle of sampling, which we may consider to be every other millisecond since a binary counter is used. An accurately timed count is produced in this manner to give a system capable of good accuracy. Greater accuracies could be attained with higher oscillation frequencies or longer timing intervals.

A multiple channel tape recorder 35 is provided. In one record channel the clock pulses are recorded from input lead 16'. A plurality of further channels, say 10, are driven by the distributor circuit 36 which cycles in synchronism to the beat frequency signals derived from the output gate 25. The distributor can be a magnetron beam switching tube type 6701 wherein each of ten output targets is coupled to a separate channel of the tape recorder. Assuming a response of 10 kc. for any tape channel, the maximum frequency of 100 kc. is recorded since it is distributed among ten channels. In each channel non return to zero recording preferably is employed, so that a change in tape polarity occurs whenever a signal is encountered at a target position.

A further sign recording channel can be employed if desired as shown by input lead 40. This is used in case the analog signals are of a selected polarity either positive or negative. The gate 42 provides sign signals from the sign detector 44 in time coincidence with the gating of the corresponding signal level code at gate 25. This sign detector may take the form of a meter relay coupled to one stage of amplifier 14 for response only if the signal is of negative (or positive) polarity.

Assume nine analog signals at source 10, and assume that ten channels are being multiplexed. Thus, a void channel is used as a marker for determining the start of a sequence of the nine signals.

To convert the pulse count notation signals recorded on the multiple tape channels to decimal form the decade counter 50 is used. The signals on all the channels 51 are mixed at the counter input. A direct count from gate 25 may be used when the recorder is not employed. In the event of portable equipment for mounting in small space provided in aircraft or the like, the counter and output system may be located in a remote position. Thus the entire system for recording signals may be quite compact and the tape may be read at the end of a mission in a land based counter and logging system if desired. Thus timing signals are recorded on the tape for use in control circuits.

Timing and control circuits 65 are operated from the timing channel on the record to read out the decade counter reading at gate 66, and reset the counter at lead 67. The timing circuits are further used to synchronize the data for use in an output logging device such as a printer 70.

Therefore in accordance with the present invention there is provided an improved analog to digital system, which is defined with particularity in the appended claims.

I claim:

1. An analog to digital conversion system comprising in combination, a source of analog signal of varying potential, a voltage responsive reactive element coupled to change reactance as a function of the analog signal level, a variable frequency oscillator including said reactive element as a frequency determining component, a further stabilized oscillator circuit, a beat frequency circuit comprising both said oscillators and providing an output signal frequency equal to the difference of the frequencies of the two oscillators, a timing interval circuit, and gating means coupled to the timing interval circuit for passing signals from the beat frequency circuit for a precise sampling time interval thereby producing in pulse count notation an indication of the amplitude of the analog signal at the sampling time.

2. A system as defined in claim 1 wherein a decade counter circuit is coupled to the gating means for registering a count in decimal form representative of the amplitude of the analog signal level.

3. A system as defined in claim 1 wherein a distributor circuit is coupled to the beat frequency circuit for synchronous operation therewith, and including a magnetic recorder having a frequency response characteristic less than that of the maximum beat frequency obtained, means for recording in multiple channels with the magnetic recorder, and means coupling the distributor circuit to commutate the signals to the multiple channels in sequence so that the signals on any one channel fall within the frequency response characteristic of the recorder.

4. A system as defined in claim 1 wherein the variable frequency oscillator undergoes a frequency change of $m$ to $n$ to $p$, the stabilized oscillator circuit has a frequency of $n$ and the analog signal controls the reactive element to establish the frequency $n$ in the variable frequency oscillator at zero voltage thereby to afford an output signal at the beat frequency circuit independent of the input polarity of the analog signal.

References Cited in the file of this patent

UNITED STATES PATENTS

| | | |
|---|---|---|
| 2,698,875 | Greenwood | Jan. 4, 1955 |
| 2,835,868 | Lindesmith | May 20, 1958 |